Oct. 19, 1937.   R. B. DAY   2,096,163
PROCESS OF IMPROVING LIGHT HYDROCARBONS
Original Filed April 29, 1931
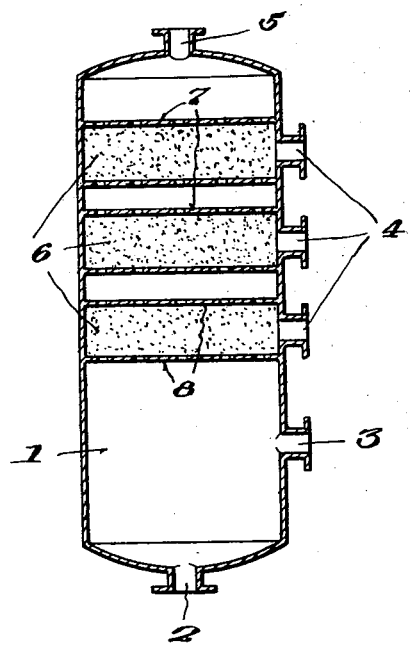
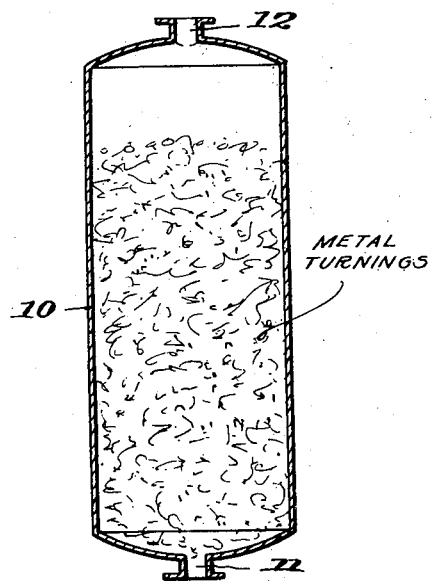
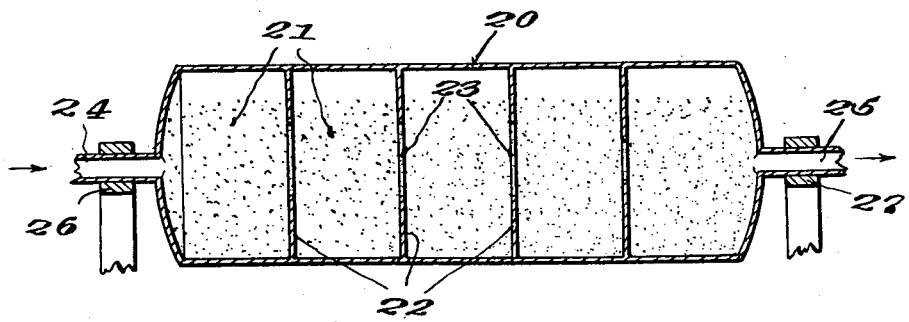
Inventor
Roland B. Day Patented Oct. 19, 1937

2,096,163

UNITED STATES PATENT OFFICE 2,096,163

PROCESS OF IMPROVING LIGHT HYDROCARBONS

Roland B. Day, Chicago, Ill., assignor, by mesne assignments, to Universal Oil Products Company, Chicago, Ill., a corporation of Delaware Application April 29, 1931, Serial No. 533,852
Renewed December 6, 1935

2 Claims. (Cl. 196—39)

This invention relates to a process for treating products of petroleum distillation or pyrogenetic decomposition, as well as natural gasolines, for the purpose of improving the same as to color, odor, doctor test, and other characteristics desirable in a commercial product.

The present invention constitutes an improvement over the invention set forth in my copending application, Serial No. 517,600, filed February 21, 1931.

In the foregoing application was described a process for treating hydrocarbons, particularly gasolines, in vapor phase with hydrochloric acid and other materials for the purpose of causing an elimination of sulphur and gums therefrom.

It has been observed that in the treatment of light hydrocarbon vapors with air, steam, and hydrochloric acid over contact materials such as metals or metal chloride, particularly if the hydrocarbons are high in oxygen compounds, considerable quantities of a gummy deposit of oxidized hydrocarbon polymer is left on the contact material, whether it be metal, metal chloride, or other suitable material.

It has been discovered that if the same light hydrocarbon oil as that treated as outlined above in vapor phase is now subjected to liquid phase contact with suitable contact material at a temperature above its endpoint but under sufficient pressure to maintain the hydrocarbon in substantially liquid phase, an increased beneficial effect by polymerization of undesirable constituents is produced on the hydrocarbon, namely, a degumming and desulphurizing, but at the same time the gummy polymers formed are immediately dissolved by the hot liquid oil at the temperature of the degumming reaction, and are thus washed out of the contact material, so that the latter does not become clogged but remains effective over a considerable period of time.

According to the present invention, a light hydrocarbon distillate or product of pyrogenetic decomposition is heated to above its end-point, generally in excess of 400° F., and is subjected to a pressure of about 60 or 75 pounds per square inch or as much as is needed to keep the bulk of the hydrocarbon in liquid phase at its elevated temperature. While in this heated condition and confined under pressure, the hydrocarbon is submitted to the action of hydrochloric acid, air, and steam, in the presence of a suitable contact catalyst, for example, metal particles or metal chloride, and additional quantities of the heated hydrocarbon are flowed through the contact mass, whereby a washing effect is secured.

The invention may be more readily understood by having reference to the accompanying drawing, in which:

Figure 1 represents somewhat diagrammatically in vertical section, a suitable form of apparatus wherein treatment of a hydrocarbon is carried out in accordance with this invention.

Figure 2 represents diagrammatically, in vertical section, a modification of the treating apparatus shown in Figure 1.

Figure 3 represents diagrammatically, in longitudinal section, a still further modification of the apparatus shown in Figure 1.

In the drawing, Figure 1, 1 represents a vertical treating tower having bottom liquid outlet pipe 2, and side inlet pipe 3, for treating agents; a plurality of side inlet pipes 4 for material undergoing treatment and hydrochloric acid gas; and a top outlet pipe 5 for vaporized treated material. Each of the side inlet pipes 4 leads into a relatively shallow packed treating section 6 consisting of a cylindrical enclosure between perforated trays 7 and 8. The treating sections 6 are packed with comminuted contact material which may consist of metal particles, such as zinc, tin, lead, iron, copper, nickel, cobalt, aluminum, cadmium, manganese, and the like, or of metallic chlorides, oxides, or other compounds having in general a catalytic action on hydrocarbon reactions, such as salts or oxides of copper, silver, lead, zinc, iron, nickel, aluminum, manganese, chromium, cobalt, tin, or of the more expensive and rare earth metals. These contact materials may exist in the packed sections per se or may be mixed with or deposited on a suitable material such as kieselguhr, fuller's earth, or inert material as a backing.

In Figure 2, 10 represents a treating tower which is filled about ⅘ full, preferably with metal turnings. The trays and auxiliary inlets of Figure 1 are omitted. 11 represents a bottom inlet for hydrocarbon and treating material, and 12 represents a top outlet for the products of the treatment.

In Figure 3, 20 represents a horizontally disposed treating chamber divided horizontally into a plurality of treating sections 21, by vertical trays 22, each tray having a central opening 23. The treating sections are filled with suitable contact material. Inlet 24 for hydrocarbons and treating agents and outlet 25 for treated hydrocarbons and spent treating agent are axially disposed and form trunnions which are supported and free to rotate in bearings 26 and 27, the whole treating chamber being thus mounted for rotary movement which may be effected from any source of power, by any conventional means, not shown.

In the operation of the process, as carried out when using the apparatus shown in Figure 1, a light hydrocarbon such as gasoline is heated to 400° F. or above and confined under sufficient pressure to maintain the hydrocarbon substantially in the liquid phase, and is then introduced together with hydrochloric acid through side inlet pipes 4 to the contact material in sections 6. In the meantime, air or steam or both, are introduced through inlet pipe 3, and these, acting on the hydrocarbon in the presence of the contact material, cause the former to polymerize. The hydrocarbon is at the same time partially vaporized, the vapors passing outwardly through outlet pipe 5, and any hydrocarbon remaining liquid after the polymerization descends in tower 1 and passes outwardly through pipe 2, whence it may be returned for further treatment. A steady flow of heated liquid hydrocarbon is maintained through treating sections 6, whereby any gummy polymers tending to form are speedily dissolved by the fresh oil or washed away.

In operating with the apparatus shown in Figure 2, which is extremely simple, the hydrocarbon to be desulphurized and depolymerized is led in liquid phase through inlet pipe 11 and through the mass of metal turnings until the tower is full of liquid, when it overflows through top outlet 12, together with any vapors formed by partial vaporization of the hydrocarbon due to release of pressure by expansion upon entering the treating tower. In this case, again, the contact mass is cleansed of adherent polymers by the inflow of heated oil.

In operating with the apparatus shown in Figure 3, the course of the hydrocarbon is the same as above, except that it proceeds to flow horizontally instead of vertically. The arrangement of the trays with central openings further causes the hydrocarbon liquid phase to build up in each section until the level of the opening is reached before proceeding to the next. During the passage of the hydrocarbon through treating unit 20, the unit is rotated from any source of power, not shown, and by convenient means, such as pulleys, spur gearing, or the like, not shown, thus giving the hydrocarbon a whirling movement in its passage through the contacting material, and promoting a greater degree of contact. The treated hydrocarbon liquid is continuously removed through outlet pipe 25.

Generic and divisible subject matter with respect to the metal, disclosed but not claimed herein, is claimed in my copending applications Serial No. 542,738, filed June 8, 1931 and Serial No. 613,517, filed May 25, 1932, which applications are continuations-in-part of this case.

I claim:—

1. A process for refining light hydrocarbon oil which comprises treating the oil, at a temperature above its normal boiling point and under sufficient superatmospheric pressure to maintain the major portion thereof in liquid phase, with added hydrogen chloride in the presence of steam and a solid contact material comprising discrete particles of a heavy metal chloride capable of existing in solid condition at said temperature and pressure.

2. A process for refining light hydrocarbon oil which comprises treating the oil, at a temperature above its normal boiling point and under sufficient superatmospheric pressure to maintain the major portion thereof in liquid phase, with added hydrogen chloride in the presence of steam and a solid contact material comprising discrete particles of zinc chloride.

ROLAND B. DAY.